(12) United States Patent
Baklanov et al.

(10) Patent No.: US 7,643,945 B2
(45) Date of Patent: Jan. 5, 2010

(54) TECHNIQUE FOR ACOUSTIC DATA ANALYSIS

(75) Inventors: Nikolay Baklanov, Sugar Land, TX (US); Sarmad Adnan, Sugar Land, TX (US); Toshimichi Wago, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/752,657

(22) Filed: May 23, 2007

(65) Prior Publication Data

US 2008/0162058 A1    Jul. 3, 2008

Related U.S. Application Data

(63) Continuation-in-part of application No. 11/617,338, filed on Dec. 28, 2006.

(51) Int. Cl.
*G01B 5/30*    (2006.01)
(52) U.S. Cl. .................................... 702/39; 702/48
(58) Field of Classification Search ............... 702/39, 702/48
See application file for complete search history.

(56) References Cited

U.S. PATENT DOCUMENTS

| | | | |
|---|---|---|---|
| 4,094,191 A | | 6/1978 | Goetsch |
| 4,489,551 A | | 12/1984 | Watanabe |
| 4,544,917 A | * | 10/1985 | Lenhoff, Jr. .................. 341/158 |
| 4,705,459 A | * | 11/1987 | Buisine et al. ................. 417/53 |
| 4,866,614 A | * | 9/1989 | Tam ............................ 600/437 |
| 5,008,841 A | | 4/1991 | McElroy |
| 5,251,151 A | | 10/1993 | Demjanenko et al. |
| 5,429,001 A | * | 7/1995 | Kleven .................... 73/861.22 |
| 5,499,538 A | | 3/1996 | Glidewell |
| 5,625,150 A | * | 4/1997 | Greene et al. ................. 73/649 |
| 5,720,598 A | | 2/2000 | Tanaka |
| 6,087,945 A | | 7/2000 | Yasuda |

(Continued)

FOREIGN PATENT DOCUMENTS

DE    19625947 C1    9/1997

(Continued)

*Primary Examiner*—Bryan Bui
*Assistant Examiner*—Jonathan Teixeira Moffat
(74) *Attorney, Agent, or Firm*—Michael Flynn; David Cate; Robin Nava (57) ABSTRACT

A method of enhancing acoustic pump data for monitoring of pump condition in operation. The enhancement may be in the form of a substantial reduction in the amount of data to be processed by firmware to a much more manageable level. This may be achieved through pre-filtering of acquired acoustic data, computing frequency momentum, and by application of a median filter to the acoustic data. Regardless, a thresholding technique that uses features vector including but not limited to double-threshold derived from statistics of enhanced amplitudes, may be employed whereby enhanced acoustic data is boiled down to a series of potential acoustic events of particular widths. These widths may represent a duration of each acoustic event and be checked for correlation with the speed of the operating speed of the pump. Acoustic events that correlate with an operating speed of the pump may represent an unhealthy condition of the pump such as where the width is about the duration of one half of a cycle of the pump and a leaky pump valve presents itself for this same period of time.

25 Claims, 6 Drawing Sheets

U.S. PATENT DOCUMENTS

| | | |
|---|---|---|
| 6,167,965 B1 * | 1/2001 | Bearden et al. ........ 166/250.15 |
| 6,338,283 B1 | 1/2002 | Blazquez |
| 6,625,541 B1 * | 9/2003 | Shenoy et al. .................. 702/6 |
| 6,675,665 B2 | 1/2004 | Blazquez |
| 6,697,741 B2 | 2/2004 | Yu |
| 6,901,791 B1 | 6/2005 | Frenz |
| 6,993,445 B2 * | 1/2006 | Clarke et al. ................ 702/106 |
| 7,013,223 B1 | 3/2006 | Zhang |
| 2002/0023495 A1 | 2/2002 | Morganti |
| 2002/0124666 A1 | 9/2002 | Navarro |
| 2004/0226346 A1 | 11/2004 | Schluecker et al. |
| 2006/0146469 A1 * | 7/2006 | Heagerty et al. ............ 361/115 |
| 2007/0250245 A1 * | 10/2007 | van der Merwe et al. ... 701/100 |
| 2008/0006089 A1 * | 1/2008 | Adnan et al. .................. 73/587 |

FOREIGN PATENT DOCUMENTS

| | | |
|---|---|---|
| WO | 03/091614 | 11/2003 |
| WO | 2004-102052 | 11/2004 |

* cited by examiner

TECHNIQUE FOR ACOUSTIC DATA ANALYSIS

CROSS-REFERENCE TO RELATED APPLICATION

This application claims priority to and is a Continuation-In-Part of U.S. patent application Ser. No. 11/617,338, filed on Dec. 28, 2006, which is incorporated herein by reference.

BACKGROUND

Embodiments described relate to the monitoring of oilfield pumps in use. In particular, embodiments of oilfield pumps are described as well as techniques for enhancing acoustic data obtained therefrom for analysis.

BACKGROUND OF THE RELATED ART

Large oilfield operations generally employ any of a variety of positive displacement pumps. Such pumps may be employed in applications for accessing underground hydrocarbon reservoirs. These applications may include cementing, coiled tubing, water jet cutting, or hydraulic fracturing of underground rock.

A positive displacement pump may be a fairly massive piece of equipment with associated engine, transmission, crankshaft and other parts, operating at between about 200 Hp and about 4,000 Hp. A large plunger is driven by the crankshaft toward and away from a chamber in the pump to dramatically effect a high or low pressure thereat. This makes it a good choice for high pressure applications. Indeed, where fluid pressure exceeding a few thousand pounds per square inch (PSI) is to be generated, a positive displacement pump is generally employed. Hydraulic fracturing of underground rock, for example, often takes place at pressures of 10,000 to 20,000 PSI or more to direct an abrasive containing fluid through an underground well to release oil and gas from rock pores for extraction.

When employing a positive displacement pump as described above, regular pump monitoring and maintenance may be sought to help ensure uptime and increase efficiency of operations. That is, like any other form of industrial equipment a pump is susceptible to natural wear that could affect uptime or efficiency. This may be of considerable significance in the case of pumps for large scale oilfield operations as they are often employed at the production site on a near round the clock basis. For example, in the case of hydraulic fracturing applications, a positive displacement pump may be employed at the production site and intended to operate for six to twelve hours per day for more than a week. Wear on pump components during such an operation may present in a variety of forms. In particular, internal valve seals of the pump are prone to failure, especially where abrasive fluids are directed through the pump during the fracturing application as described.

Issues with wearing pump components such as the noted valve seals may be accompanied by certain vibrations particular to the type of wear taking place. Therefore, it is not uncommon to monitor the health of a pump during operation by taking into account such acoustic or vibration information. For example, an acoustic sensor may be coupled to the pump to detect high-frequency vibrations particular to a leak or incomplete seal within the chamber of the positive displacement pump. Such a leak is a common precursor to pump failure. By employing an acoustic sensor in this manner, the costly and somewhat unreliable alternative of regularly timed interruption of pump operation for manual seal inspection and replacement may be avoided. Similar acoustic monitoring of the health of the pump may be employed for the detection of other types of potential pump component wearing as well.

Unfortunately, the above described technique of monitoring the health of the pump via detection of acoustic information during pump operation faces practical challenges to implementation. For example, certain malfunctions may not present in a consistently acoustic manner, such as where a leak in a seal is temporarily occluded by debris. Another, perhaps more significant, challenge to decipherability of pump malfunction is due to the fact that pump operations often employ several pumps and associated equipment simultaneously at a production site. Thus, given the vast amount of equipment involved, the total acoustic data detected may render the deciphering of a leaky valve or other pump malfunction from mere noise quite difficult. That is, the massive amount of acoustic data available may place a practical strain on conventional firmware available to a given pump or assembly. In fact, at present the amount of computational tasks required of available firmware for determining the presence of an early stage pump leak may be unrealistic given the sheer volume of acoustic data that would be collected from a multi-pump operation.

SUMMARY

An embodiment of analyzing acoustic data obtained from a pump is disclosed. The data is collected from the pump operating at a given speed. A portion of the acoustic data may be filtered out based on frequency followed by an enhancement of the remaining data, again depending on a frequency range of interest. A histogram may then be established from the enhanced acoustic data whereby upper and lower thresholds of magnitude are determined. These thresholds may then be employed in a thresholding technique to identify an acoustic event correlating with the speed of the operating pump.

DETAILED DESCRIPTION

Embodiments are described with reference to certain positive displacement pump assemblies for fracturing operations. However, other types of pumps may be employed for a variety of operations. Regardless, embodiments described herein include techniques that achieve improved levels of manageability and distinctiveness for analysis of acoustic events from an operating oilfield pump. This may be achieved by enhancing the magnitude of acoustic data obtained from the pump and/or by establishing upper and lower thresholds for thresholding of the acoustic data.

Figure 1:
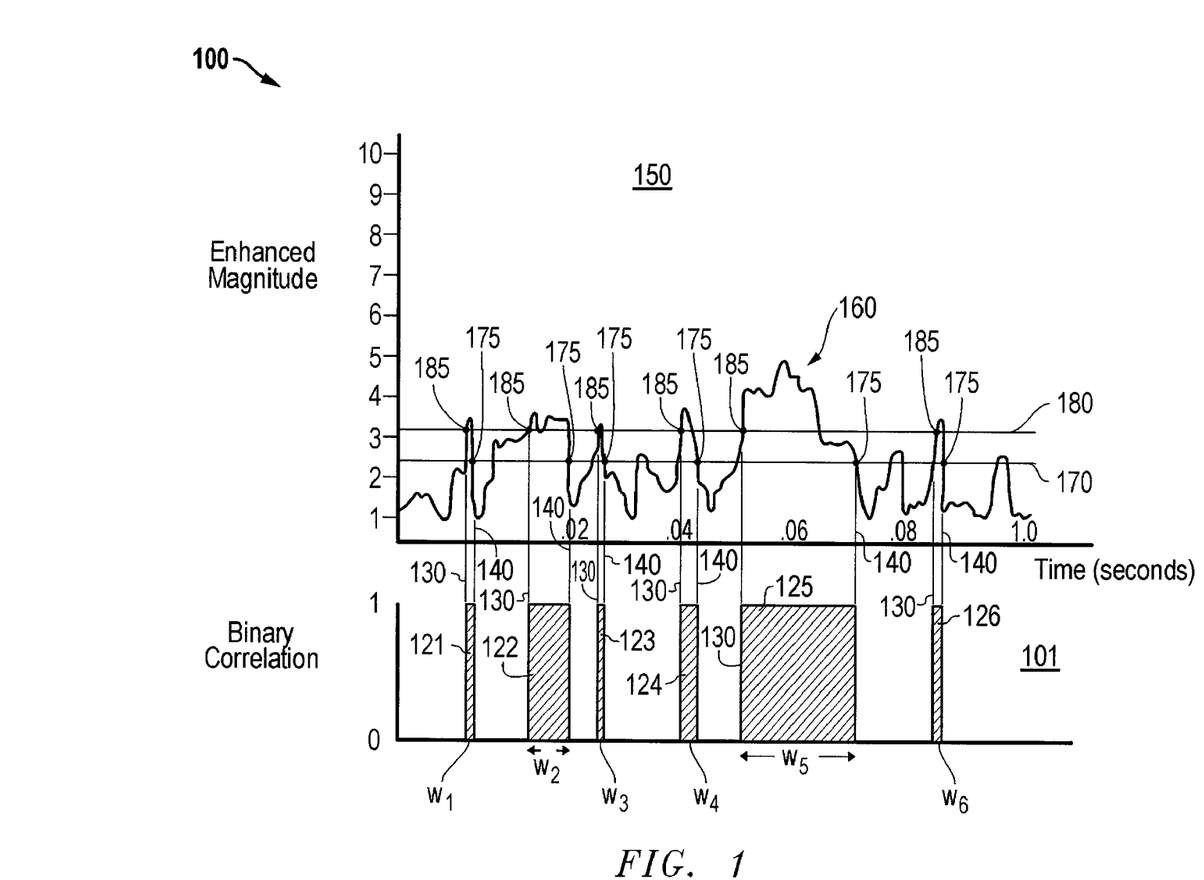
FIG. 1 is a binary acoustic data analysis chart depicting an embodiment of acoustic data obtained from a pump that is enhanced and analyzed by correlation with a speed of the pump.

Referring specifically now to FIG. 1, a binary acoustic data analysis chart 100 is depicted. The chart 100 reveals acoustic data obtained from an operating oilfield pump 201 such as that of FIGS. 2 and 3. In particular, the chart 100 depicts a binary data table 101 culled from an enhanced acoustic data table 150 thereabove. As detailed below, binary data table 101 may reveal a host of acoustic events 121-126 of widths $W_1$-$W_6$, respectively. Each width $W_1$-$W_6$ may represent the duration of its associated acoustic event 121-126. Thus, where a speed of the pump 201 is known, a correlation may be drawn between the acoustic event 121-126 and the operational rate of the pump 201. For example, an acoustic event 125 is depicted in FIG. 1 that is of a given width $W_5$ that is roughly the duration of half a stroke of the pump 201. Thus, as described below this particular acoustic event 125 may be indicative of a leaky valve within the pump 201 that fails to seal for an intended duration of the width $W_5$. Correlation of thresholded acoustic data to pump speed and mechanics in this manner allows for the ready identification of potential or arising pump problems.

The thresholded acoustic data noted above is depicted at the binary data table 101 as the presence or absence of graphically idealized and unitary thresholded acoustic events 121-126. Therefore, correlations between acoustic data and pump mechanics may be drawn with minimal interference from acoustic noise or extraneous data that is unrelated to the timed mechanics of the pump. That is, the acoustic events 121-126 are depicted in a binary manner. Over the time period monitored, 1.0 second in this case, the thresholded acoustic data is assigned a binary correlation of either 0 or 1. Wherever an acoustic event 121-126 is depicted a value of 1 is assigned and depicted, otherwise a value of 0 is applied. Thus, noise and other acoustic irregularities are filtered out of the analysis by the assignment of the 0 value. Minimizing the acoustic data for analysis in this manner also substantially reduces the strain that is otherwise placed on firmware responsible for interpretation of the acoustic data.

Continuing with reference to FIG. 1, binary notation or thresholding of the data in the binary data table 101 is achieved by extrapolation from the acoustic data table 150 thereabove. The acoustic data table 150 is a graphic representation of acoustic data of enhanced magnitude collected over a period of time. As depicted in FIG. 1, the period of time is about 1.0 second and the enhanced magnitude that is examined is on a scale of 1-10. However, as detailed further herein, a variety of time periods and scales of magnitude may be examined which encompass pump acoustics and operational mechanics likely to be encountered. Preferably the time period monitored is of a duration that is at least about that of 4/3 of a complete reciprocation or cycling of the pump as detailed below. In one embodiment, the acoustic data is collected over a series of time periods that are equivalent to the duration of a complete cycling of the pump. In this manner, the effect of any inconsistent presence or lack of acoustics may be significantly reduced upon subsequent acoustic data analysis. Additionally, embodiments described below also detail techniques by which the acoustic data may be enhanced for representation by the acoustic data table 150 as well as the determination of upper 180 and lower 170 thresholds.

The noted upper 180 and lower 170 thresholds are established as detailed below in order to allow the extrapolation of the binary data table 101 from the acoustic data table 150. This may be achieved by notation of particular intersections of the enhanced acoustic data and the thresholds 170, 180. For example, as the acoustic data is recorded moving toward 1.0 second on the table 150 it fluctuates between higher and lower levels of enhanced magnitude, at times crossing the noted thresholds 170, 180. For embodiments described herein, an uptick 130 from the binary data table 101 is recorded whenever the enhanced magnitude of the acoustic data rises from below the lower threshold 170 and crosses a highpoint 185 of the upper threshold 180. Similarly, a downtick 140 to the binary data table 101 is recorded whenever the enhanced magnitude of the acoustic data drops from above the upper threshold 180 and crosses a lowpoint 175 of the lower threshold 175. Thus, a width $W_1$-$W_6$ between the uptick 130 and downtick 140 may be established for each acoustic event 121-126.

As indicated above, the width $W_5$ of a particular acoustic event 125 on the acoustic data table 101 corresponds with the timing of about half of a stroke of the pump providing the acoustic data. According to the technique described above, this determination may be readily measured by examination of the different widths $W_1$-$W_6$ involved. The idealized unitary appearance of the acoustic events 121-126 aids in this technique. Furthermore, the clean unitary appearance of each acoustic event 121-126 is enhanced by the relevance and placement of each highpoint 185 and lowpoint 175. For example, a highpoint 185 or lowpoint 175 is not necessarily recorded each and every time acoustic data traverses an upper or lower threshold 170, 180. Rather, as described above, certain conditions are required for the designation of a highpoint 185 or lowpoint 175. In this manner, the incremental fluctuations in the enhanced magnitude of the acoustic data fail to have a significant impact on the presentation of the acoustic events 121-126.

For example, when examining the valve leak data 160, an uptick 130 is marked as the acoustic data crosses above the upper threshold 180 at the highpoint 185, having come from below the lower threshold 170. However, as the acoustic data eventually makes its way back down to below the upper threshold 180, the lowpoint 175 is not initially depicted. Rather, only once the acoustic data crosses below the lower threshold 170, is the lowpoint 175 depicted for marking of the downtick 140. In this manner, less significant and more incremental fluctuations in the enhanced magnitude of the acoustic data fail to affect the width $W_5$ of the acoustic event 125. Thus, the event 125 may be properly correlated with a valve leak of a duration that is roughly the width $W_5$, based on the known speed of the pump 201. The manner by which the upper 180 and lower 170 thresholds are established is detailed further below.

Figure 2:
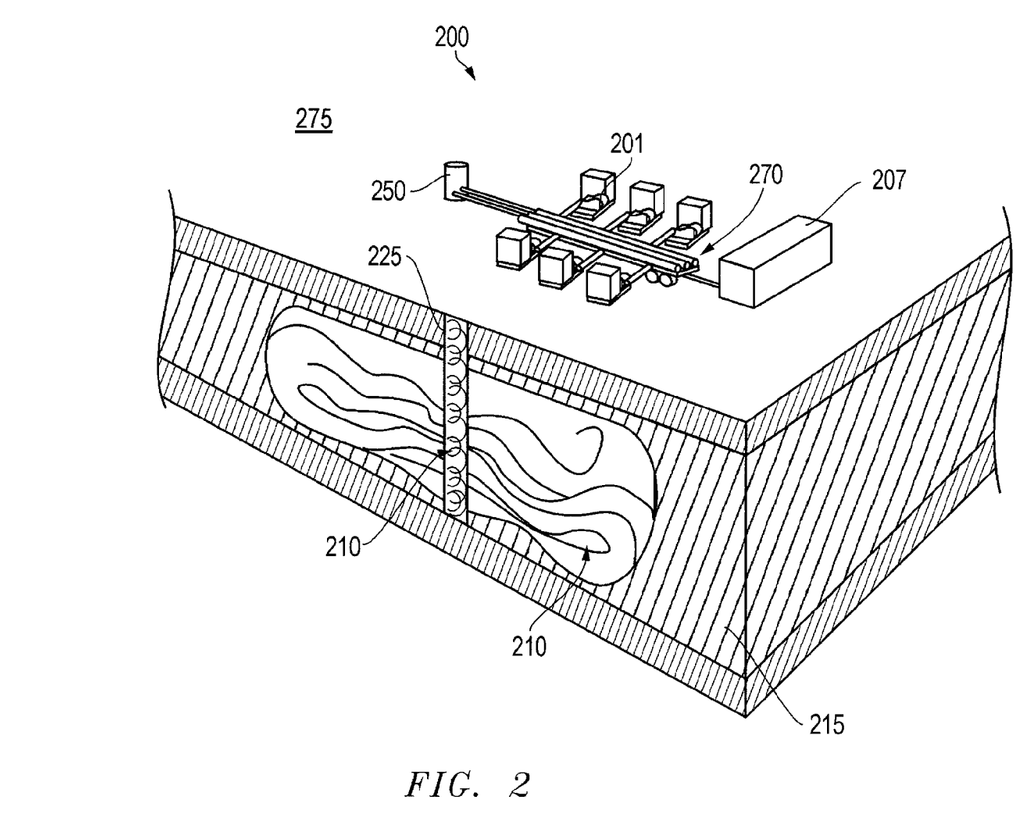
FIG. 2 is a perspective sectional view of an embodiment of a multi-pump system for employing the technique of FIG. 1 during a fracturing operation at an oilfield.

Continuing now with reference to FIG. 2, a pump 201 is depicted as part of a multi-pump assembly 200 at an oilfield 275. The pump 201 may have an acoustic sensor coupled thereto for obtaining raw acoustic data therefrom. Techniques may be applied to this raw acoustic data as detailed below in order to ultimately attain the acoustic data of enhanced magnitude as depicted in the acoustic data chart 150 of FIG. 1.

As shown in FIG. 2, the monitored pump 201 and others of the assembly 200 may be conventional triplex pumps employed in a fracturing operation. The pumps may operate at between about 1,500 Hp and about 5,000 Hp to propel an abrasive fluid 210 through a manifold 270 and into a well 225 via a wellhead 250. A blender 207 and other potentially noisy equipment may also be employed in line with the monitored pump 201. Ultimately, the abrasive fluid 210 may be directed at up to about 20,000 PSI toward fracturable rock 215 or other earth material as is the nature of a conventional fracturing operation. In total, this type of operation generates a considerable amount of detectable acoustics, most of which may be noise unrelated to a particular unhealthy condition of the monitored pump 201. Therefore, techniques of managing the acoustic data are detailed here whereby a considerable amount of such noise may be filtered out or set aside in advance of any detailed analysis by firmware associated with the monitored pump 201.

Figure 3:
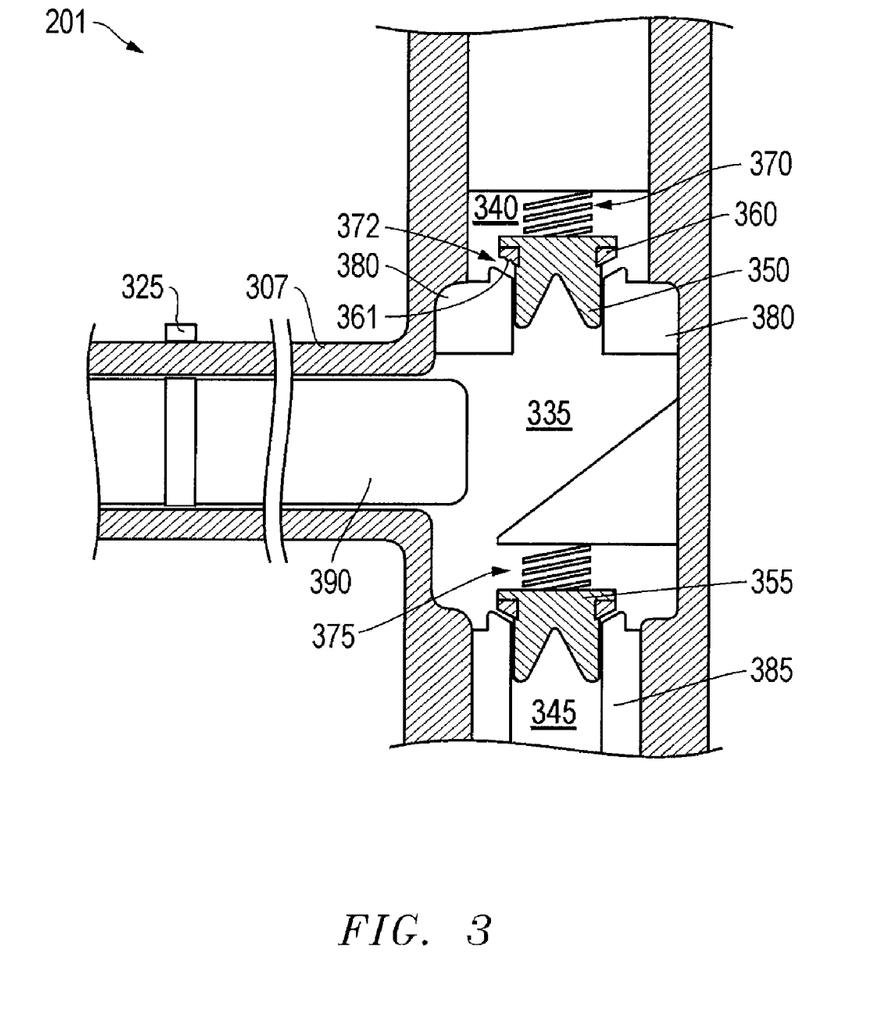
FIG. 3 is a side cross sectional view of a pump of the system of FIG. 2 having a leaky valve providing acoustic data for analysis as shown in FIG. 1.

Continuing now with reference to FIG. 3, with added reference to FIG. 2, a cross-section of the monitored pump 201 is depicted wherein an acoustically detectable unhealthy condition is present in the form of a leaky valve seal 360. As detailed further herein, the acoustics of this leaky valve seal 360 may ultimately be depicted as an acoustic event 125 as shown in FIG. 1 which correlates with a duration of about half of a stroke of a plunger 390.

As noted above, the pump 201 includes a plunger 390 for stroking or reciprocating through a plunger housing 307 toward and away from a chamber 335. In this manner, the plunger 390 effectuates high and low pressures on the chamber 335. That is, as the plunger 390 is thrust toward the chamber 335, the pressure within the chamber 335 is increased. At some point, the pressure increase will be enough to effect an opening of a discharge valve 350 to allow the release of fluid and pressure within the chamber 335. The amount of pressure required to open the discharge valve 350 may be determined by a discharge mechanism 370 such as a valve spring which keeps the discharge valve 350 in a closed position until the requisite pressure is achieved in the chamber 335. In an embodiment where the pump 201 is to be employed in a fracturing operation as described above, pressures may be achieved of up to about 20,000 PSI in this manner.

The plunger 390 may also effect a low pressure on the chamber 335. That is, as the plunger 390 retreats away from the chamber 335, the pressure therein will decrease. As the pressure within the chamber 335 decreases, the discharge valve 350 will close returning the chamber 335 to a sealed state. As the plunger 390 continues to move away from the chamber 335 the pressure therein will continue to drop, and eventually a low or negative pressure will be achieved within the chamber 335. Similar to the action of the discharge valve 350 described above, the pressure decrease will eventually be enough to effect an opening of an intake valve 355. The opening of the intake valve 355 away from valve seat 385 allows the uptake of fluid into the chamber 335 from a fluid channel 345 adjacent thereto. The amount of pressure required to open the intake valve 355 may be determined by an intake mechanism 375 which again may be a spring for keeping the intake valve 355 in a closed position until the requisite low pressure is achieved in the chamber 335.

As described above, and with added reference to FIG. 1, a reciprocating or cycling motion of the plunger 390 toward and away from the chamber 335 within the pump 201 controls pressure therein. The valves 350, 355 respond accordingly in order to dispense fluid from the chamber 335 through a dispensing channel 340 and ultimately out of the pump 201 at high pressure. That fluid is then replaced with fluid from within a fluid channel 345. All of the movements of the various parts of the pump 201 as described may resonate to a degree throughout the pump 201 including to its non-moving portions, such as at a pump housing where an acoustic sensor may be located for recording such resonating vibrations.

As noted, certain acoustic vibrations may be indicative of an unhealthy valve seal 360 of the pump 201. For example, upon closer inspection of FIG. 3 it is apparent that the conformable valve seal 360 may include a damaged portion 361. The conformable nature of such a valve seal 360 is conducive to the pumping of abrasive containing fluids through the pump 201 as is often called for in the case of fracturing operations. For example, the abrasive fluid may include a proppant such as sand, ceramic material or bauxite mixed therein. The conformable nature of the valve seal 360 allows it to conform about any proppant present at the interface 372 of the discharge valve 350 and seat 380. Unfortunately, the conformable nature of the valve seal 360 also leaves it susceptible to the unhealthy circumstance of degradation by such abrasive fluids.

The conformable valve seal 360 may be of urethane or other conventional polymers employed in a conventional fracturing operation as described above. Such materials may degrade completely in about one to six weeks of substantially continuous use. Due to the resulting damaged portion 361 a completed seal fails to form between the valve 350 and the valve seat 380. Thus, as noted above, an acoustic vibration indicative of an unhealthy condition of the operating pump 201 may persist that is attributable to a growing leak between the chamber 335 and the dispensing channel 340, or between the chamber 335 and the channel 345.

As noted, acoustic vibrations indicative of an unhealthy pump condition as well as others may be detected by a conventional acoustic sensor and analyzed by a processor. Additionally, a conventional proximity switch 325 may deliver pump speed and timing information to such a processor. In this manner, retrieved acoustic data may be analyzed for any correlation to pump mechanics, for example, as depicted in FIG. 1. Indeed, in the embodiment shown in FIG. 3, acoustic data that is indicative of an unhealthy condition of the pump 201 may be present for a duration that is roughly equivalent to half of a stroke of the plunger 390. That is, the damaged portion 361 prevents the valve seal 360 from completely sealing against the valve seat 380. Thus, as pressure within the chamber 335 is reduced by the half stroke of the plunger 390 away therefrom, fluid may undesirably leak from the dispensing channel 340 and into the chamber 335. As well, fluid may undesirably leak from the chamber 335 into the channel 345 while plunger 390 goes into the chamber 335 thus increasing pressure there. These leaks may be perceived as acoustic data and, by knowing the speed of the plunger 390, the processor may correlate the acoustic data with certain mechanics of the pump 201, such as a duration of a half stroke of the pump 201. Thus, correlations such as that of FIG. 1 may be obtained to identify problems in the operation of the pump 201.

Referring now to FIGS. 4A-4D, embodiments of tailoring and enhancing the collected acoustic data are described. For example, the mechanics of the pump 201 and the potential associated acoustics may be analyzed as described above with reference to FIGS. 2 and 3 as described above. Nevertheless, the sheer volume of available acoustic data from a pump operation may exceed processor capacity or lack particular focus on frequencies of interest. Thus, tailoring and enhancing of the acoustic data as described below, and with reference to FIG. 1 above, may be of significant benefit.

Figures 4A, 4B:
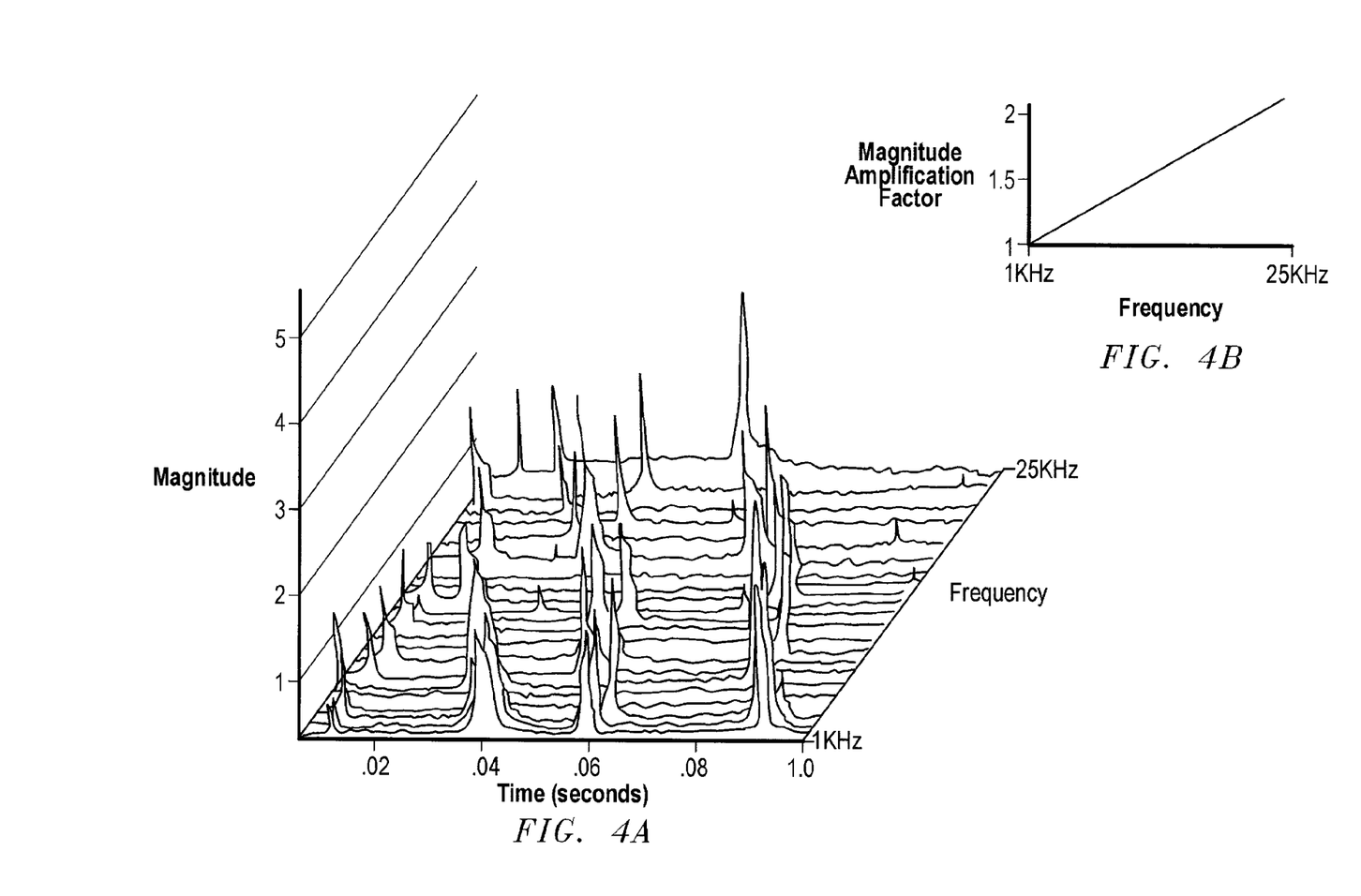
FIG. 4A is a chart depicting an embodiment of presenting pre-filtered acoustic data obtained from the pump of FIG. 3.
FIG. 4B is a chart depicting an embodiment of a technique for amplifying the acoustic data of FIG. 4A.

Referring to FIG. 4A in particular, the sensor itself may be configured to obtain data in a particular frequency range for building of a short-time fast Fourier transform (STFFT). For example, as depicted in FIG. 4A, the sensor may be tailored to pick up frequencies of between about 1 KHz and about 25 KHz, where leak acoustics such as those described above are likely to present. In this manner, the acoustic data may be considered pre-filtered. Additionally, in other embodiments, other frequency ranges may be examined. Furthermore, acoustic data may be accumulated in a manner to further processing of the data into a variety of separate frequency zones in order to obtain independent leak estimations for each of the zones.

Continuing with reference to FIG. 4A, a conventional acoustic sensor is equipped with a built-in upper limit of frequency detection capacity, such as at about 25 KHz in accordance with the depicted data. Therefore, modification of such an acoustic sensor to avoid relay of acoustic information in the 0-1 KHz range alone may significantly limit the amount of generally acceptable noise that would otherwise be delivered to the processor for analysis. Thus, stress on the processor is reduced. Such low level noise may also be addressed by employment of a white noise filter coupled to the sensor. Regardless, techniques described herein may be thought of as substantially eliminating or minimizing such low level resonance attributable to the acoustic sensor's raw uptake of data. In fact, as detailed below, a technique of averaging frequencies may be employed to affect the presentation of resonance that would otherwise present in the form of peaks along a time axis.

Continuing with reference to FIGS. 4A and 4B, acoustic information is collected over a period of time, 1.0 second in the particular embodiment of FIG. 4A. The acoustic information that is made available to a processor for analysis is that which presents in a frequency range of between about 1 KHz and about 25 KHz as indicated above. However, additional enhancement of the acoustic data may be of benefit in order to more closely examine frequencies where unhealthy pump acoustics of particular concern are more likely to present. For example, embodiments are described herein with reference to a triplex pump 201 that employs a conformable valve seal 360 in pumping an abrasive fluid at high pressure as detailed above with reference to FIGS. 2 and 3. Thus, there is a likelihood of, and concern over, deterioration of the valve seal 360. Therefore, given that acoustics of such deterioration are likely to begin appearing in higher frequencies, such higher frequencies may be amplified. That is, what may be referred to as a frequency momentum may be applied to obtain an averaged acoustic response over the frequency range peculiar to STFFT for each point in time, thus transforming FIG. 4A to FIG. 4C.

FIG. 4B depicts a linear function whereby the magnitude of the acoustic data is amplified by between 1 to 2 times depending on the particular frequency at which the data presents. That is, in the embodiment shown, acoustic data that presents at about 25 KHz in the chart of FIG. 4A is doubled in magnitude whereas data presenting below 25 KHz is magnified to a lesser degree until ultimately the acoustic data that presents at about 1 KHz is entirely left alone. In this manner, the frequency axis may be removed through averaging procedure and accounted for within an axis of magnitude. The three dimensional chart of FIG. 4B may be transformed according to this technique into the two dimensional chart of FIG. 4C with added emphasis being placed on higher frequency data as reflected by the resulting enhanced magnitude. Thus, higher frequency earlier stage leaks and other such acoustic data are likely to be captured for analysis. This "stacking" of independent waveforms into a single averaged waveform itself helps to minimize the effect of any inconsistent acoustics and reveal stroke phases of a cycling pump. Additionally, smoothed enhanced magnitude or envelope detection representation may be achieved based on application of a weighted exponential average of data or by FIR implementation of a Hilbert transform.

As depicted in FIG. 4B, a magnitude amplification factor of up to 2 may be employed. However, in other embodiments, alternative maximum amplitude magnification factors may be employed. Furthermore, application of the magnitude amplification factor need not be linear as depicted in FIG. 4B. For example, in another embodiment, the amplitude magnification factor is applied across the frequency range in an exponential or logarithmic manner in order to more dramatically pronounce magnitudes of higher or medium frequencies.

Figure 4C:
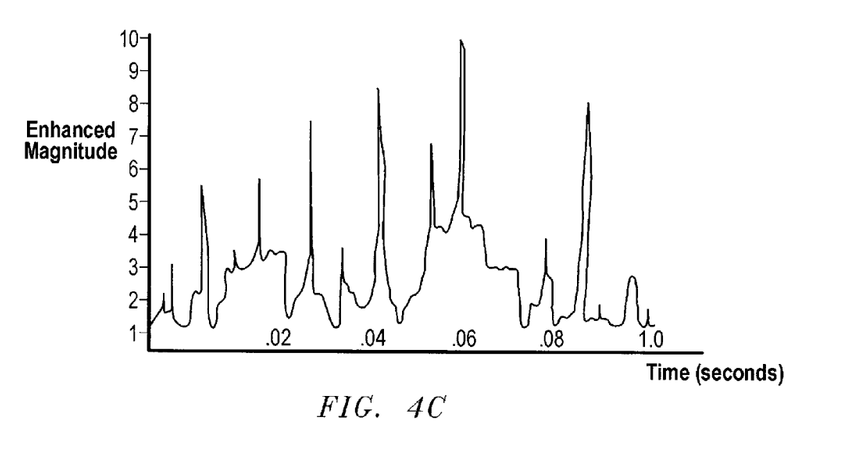
FIG. 4C is a chart depicting acoustic data of FIG. 4A upon amplification by the technique of FIG. 4B.

Referring now to FIG. 4C a chart depicting acoustic data that has been enhanced as detailed above is shown. The acoustic data is presented over the same 1.0 second time period as in the depiction of FIG. 4A, but without reference to particular frequencies. Rather, a magnitude of between 1 and 10 is depicted that is enhanced by tailored amplification from that of FIG. 4A by way of the magnitude amplification factor of FIG. 4B. While the acoustic data still may undergo further enhancement by way of smoothed peaks, it does provide the underlying data found in the chart of FIG. 1 as described above. That is, with simultaneous reference to FIGS. 1 and 4C, the acoustic data of FIG. 4C is substantially the same acoustic data that has been thresholded as described with reference to FIG. 1 above. Thus, due to the described tailored amplification that is presented in the chart of FIG. 4C, the analysis technique of FIG. 1 is likely to capture higher frequency earlier stage leak data or other targeted frequency data of interest.

Figure 4D:
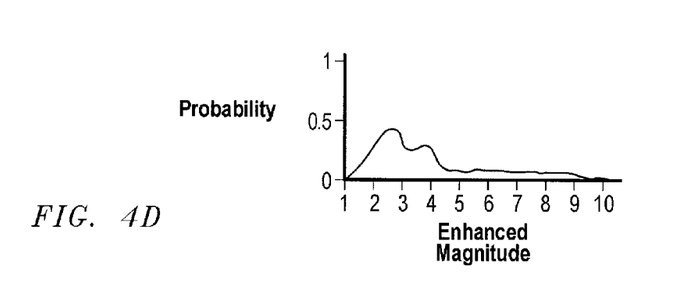
FIG. 4D is a chart depicting an embodiment of a histogram of magnitudes obtained from acoustic data of the chart of FIG. 4C and used to estimate thresholds to subsequently form the enhanced acoustic data analysis chart of FIG. 1.

Continuing with reference to FIGS. 4C and 4D, the presentation of acoustic data is modified for presentation in the form of the chart of FIG. 1. For example, the acoustic data of FIG. 4C may be smoothed out to take on the presentation of FIG. 1. This may be achieved by application of a conventional median filter or other noise reduction technique wherein sharp spikes of acoustic data presenting for no more than a predetermined incremental period of time are eliminated. In this manner, the acoustic data of FIG. 4C may take on the appearance of the acoustic data presented in FIG. 1. Thus, the eliminated data of sharp spikes or peaks fails to play a role in the analysis technique described above with reference to FIG. 1. As a result, noise leading to the formation of such peaks is omitted in the processor's analysis of the provided acoustic data. Rather, the processor is left to analyze acoustic data more likely of concern. Furthermore, a pure image processing algorithm such as a "snake algorithm" may be utilized to enhance the floor level of the waveform of FIG. 4C to allow interpolation thereof with primitive lines.

In addition to smoothing out of acoustic data peaks as described, the analysis technique described with reference to FIG. 1 above employed upper 180 and lower 170 thresholds. These thresholds 170, 180, may be obtained by examination of the enhanced magnitude of FIG. 4C. For example, the histogram of FIG. 4D depicts how the enhanced magnitude of FIG. 4C would appear in terms of probability of occurrences. That is, the enhanced magnitude across the x axis of FIG. 4D is graphically depicted against the probability of the enhanced magnitude being present in the time period monitored and represented at the chart of FIG. 4C. In the embodiment shown in FIG. 4D, the most likely enhanced magnitude occurrences are present at about 2.5 and then at about 3.5. Therefore, the upper 180 and lower 170 thresholds are set at slightly greater than 2.5 and slightly less than 3.5 for the analysis technique described with respect to FIG. 1 above. In this manner, the analysis technique employs a statistical filter accounting for the dynamic nature of the pump operation acoustics. Thus, the effect of incremental fluctuations in the enhanced magnitude on processor analysis of the data may be minimized as detailed above.

As described above, the strain on processor capacity for analysis of acoustic data has been minimized by elimination of acoustic data below 1 KHz, and by subsequent averaging over frequency dimension of STFFT, thus mapping it into a 2-D matrix, the process being equivalent to convolution in time-domain according to Parseval's theorem (thus retaining acoustic energy all over the initial waveform). Additional acoustic data is eliminated from analysis by application of a conventional median filter technique. Furthermore, the data that is analyzed may be enhanced by amplification of magnitude for frequencies of interest. A processor may then be employed to analyze such idealized acoustic data to reveal a set of parameters referred to herein as a "features vector". The features vector may be employed to estimate thresholds for double-threshold discriminator. In one embodiment, neural network algorithms may be run on such features vectors along with associated hidden Markov chains in order to estimate the upper 180 and lower 170 thresholds. Furthermore, a signal classification block may be introduced based on the features vector in order to distinguish an unhealthy condition as acoustically detected versus improper wiring or a malfunctioning sensor. A features vector may also be employed to allow software to gain control feeding therewith in order to adjust acoustic input.

Later, the processor, by way of a analysis technique based on applying such thresholds to the enhanced magnitudes, may minimize the effect of incremental fluctuations in the enhanced magnitude being analyzed. With reference to the flow-chart of FIG. 5, these techniques of analysis may be summarized as detailed below.

Figure 5:
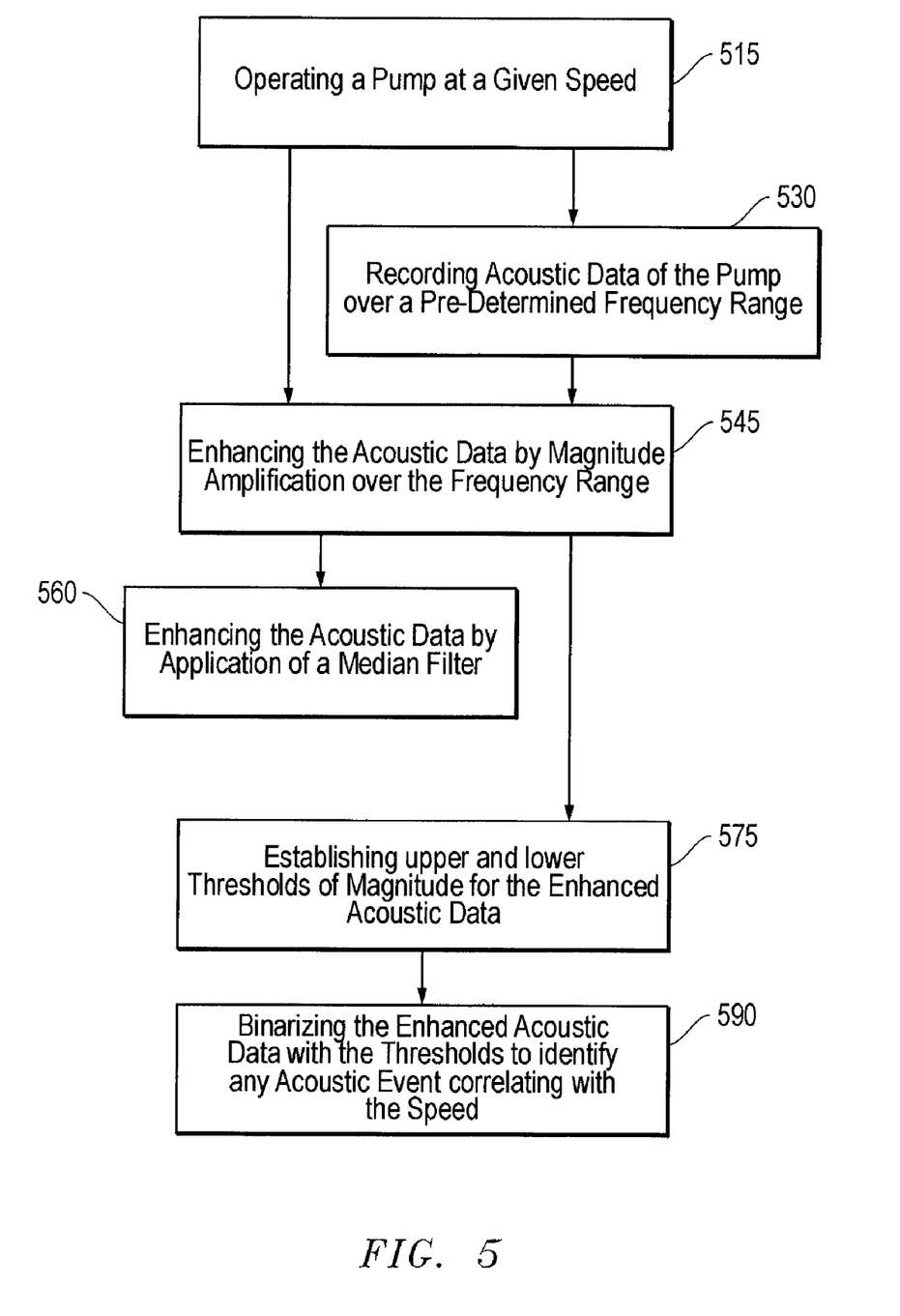
FIG. 5 is a flow-chart summarizing an embodiment of employing enhanced acoustic data from a pump for determination of a condition of the pump.

FIG. 5 depicts a flow-chart wherein the above described analysis techniques may be applied to an operating oilfield pump. That is, the pump is operated at a given speed as indicated at 515 and ultimately acoustic data therefrom is thresholded for identifying any acoustic event that may be correlated with that speed (see 590). In order to achieve this result, the acoustic data from the pump may be pre-filtered or recorded over a pre-determined frequency range as indicated at 530. This may help to reduce noise in frequency ranges not of interest. The acoustic data may also be enhanced by magnification of frequency ranges of interest as indicated at 545 along with computing the frequency momentum, and by subsequent application of a median filter to again reduce noise (see 560). Thresholding is applied to the acoustic data by establishing upper and lower thresholds of magnitude from which acoustic events may be extrapolated as indicated at 575 and 590. Acoustic events correlating with the timing and speed of the pump may then be identified as potential indicators of an unhealthy pump condition.

Embodiments described hereinabove reveal techniques for analyzing acoustic data from an operating oilfield pump in a manageable and decipherable manner. The amount and type of acoustic data presented for analysis by system firmware may be drastically reduced by using binary notation as well as techniques employed for noise reduction. The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, techniques described above are applied to an individual oilfield pump that may be a part of a larger multi-pump assembly. However, other pumps or all pumps of the very same multi-pump assembly may be monitored according to techniques detailed herein. Furthermore, the foregoing description should not be read as pertaining only to the precise structures described and shown in the accompanying drawings, but rather should be read as consistent with and as support for the following claims, which are to have their fullest and fairest scope.

We claim:

1. A method of analyzing acoustic data of a pump, the method comprising:
    operating the pump at a given speed;
    recording the acoustic data from the pump over a series of time periods during said operating;
    averaging acoustic data of the multiple cycles to minimize an effect of any inconsistent acoustics by stacking waveforms from the recorded acoustic data into a single averaged waveform;
    enhancing the acoustic data for analysis;
    determining upper and lower thresholds of magnitude for the recorded acoustic data based on the enhanced data; and
    thresholding the acoustic data for identifying any acoustic event correlated to the speed.

2. The method of claim 1 wherein said thresholding comprises determining a width of any acoustic event, the width representing a duration of the acoustic event, the method further comprising employing a processor to compare the speed and the duration for the identifying.

3. The method of claim 2 wherein the duration is about half a stroke of the operating pump to indicate a valve leak in the pump.

4. The method of claim 1 further comprising:
    noting a beginning of an acoustic event once a magnitude of the enhanced acoustic data crosses the upper threshold from below the lower threshold; and
    noting an end of the acoustic event once the magnitude of the enhanced acoustic data crosses the lower threshold from above the upper threshold, the width defined by the distance between the beginning and the end.

5. The method of claim 1 wherein said establishing comprises applying a histogram technique to the enhanced acoustic data.

6. The method of claim 1 wherein said recording is of a predetermined frequency range.

7. The method of claim 1 wherein said recording occurs via an acoustic sensor coupled to a white noise filter.

8. The method of claim 1 wherein said recording is established over a plurality of frequency zones for independent analyses thereof.

9. The method of claim 1 wherein said enhancing comprises amplifying a magnitude of the acoustic data over a frequency range.

10. The method of claim 9 wherein said amplifying is applied over the frequency range in one of a linear manner and an exponential manner.

11. The method of claim 9 wherein said amplifying is applied to a greater degree at a higher end of the frequency range to enhance a presentation of the acoustic data resulting from an early stage valve leak in the pump.

12. The method of claim 1 wherein said enhancing comprises smoothing a presentation of the acoustic data with one of weighted exponential averaging and an FIR implementation of a Hilbert transform.

13. The method of claim 1 wherein enhancing comprises at least computing frequency moments of the acoustic data.

14. The method of claim 1, wherein recording comprises obtaining data in a particular frequency range with the use of a short-time fast Fourier transform (STFFT).

15. A method of enhancing acoustic data of a pump, the method comprising:
   operating the pump;
   recording the acoustic data from the pump in a predetermined frequency range during said operating;
   amplifying a magnitude of the acoustic data over the frequency range;
   integrating the amplified magnitude of the acoustic data and subsequently removing a frequency dimension of the acoustic data by stacking waveforms from the acoustic data into a single averaged waveform;
   enhancing the amplified magnitude of the acoustic data by application of a median filter, said recording in the predetermined frequency range and said enhancing reducing storage of the acoustic data that is noise.

16. The method of claim 15 wherein the predetermined frequency range is between about 1 KHz and about 25 KHz.

17. The method of claim 15 wherein said recording occurs over periods of at least about 4/3 of a cycle of the operating pump.

18. The method of claim 15 wherein said operating is at a known speed, the method further comprising thresholding the acoustic data for identifying any acoustic event correlating with the speed.

19. The method of claim 15, wherein stacking comprises averaging acoustic data to minimize an effect of any inconsistent acoustics.

20. The method of claim 15, wherein recording in a predetermined frequency range comprises obtaining data with the use of a short-time fast Fourier transform (STFFT).

21. An oilfield pump assembly comprising:
   a pump for operating at a given speed;
   an acoustic sensor coupled to said pump for acquiring acoustic data therefrom during said operating; and
   a processor coupled to said acoustic sensor for acquiring information regarding the acoustic data and the speed, said processor identifying any acoustic event correlated to the speed by determining upper and lower thresholds of magnitude for the acoustic data based on the acquired data and subsequent thresholding analysis of the acquired acoustic data by stacking waveforms from the acoustic data into a single average waveform.

22. The oilfield pump assembly of claim 21 wherein the acoustic event is an unhealthy condition of the pump.

23. The oilfield pump assembly of claim 22 wherein said pump further comprises a valve seal disposed therein, the unhealthy condition being a leak in said valve seal.

24. The oilfield pump assembly of claim 23 wherein the unhealthy condition of the leak is identified by an acoustic event persisting for about the duration of one half of a stroke of the pump.

25. The oilfield pump assembly of claim 21 wherein said pump is of a triplex configuration for a fracturing operation.

* * * * *